US009933826B2

(12) United States Patent
Donlin et al.

(10) Patent No.: US 9,933,826 B2
(45) Date of Patent: Apr. 3, 2018

(54) METHOD AND APPARATUS FOR MANAGING NODAL POWER IN A HIGH PERFORMANCE COMPUTER SYSTEM

(71) Applicant: HEWLETT PACKARD ENTERPRISE DEVELOPMENT LP, Houston, TX (US)

(72) Inventors: Patrick Donlin, Deephaven, MN (US); Andrew Warner, Edina, MN (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 14/709,201

(22) Filed: May 11, 2015

(65) Prior Publication Data
US 2016/0334846 A1 Nov. 17, 2016

(51) Int. Cl.
G06F 1/00 (2006.01)
G06F 1/26 (2006.01)
G06F 1/32 (2006.01)
G06F 9/50 (2006.01)

(52) U.S. Cl.
CPC ............. *G06F 1/266* (2013.01); *G06F 1/324* (2013.01); *G06F 9/5094* (2013.01); *Y02B 60/1217* (2013.01); *Y02B 60/142* (2013.01)

(58) Field of Classification Search
CPC .................................. G06F 1/266; G06F 9/54
USPC .............. 713/340, 300, 320, 324, 310, 323; 370/311; 715/735; 700/297
See application file for complete search history.

(56) References Cited

U.S. PATENT DOCUMENTS

| 7,210,048 | B2 | 4/2007 | Bodas | |
|---|---|---|---|---|
| 7,886,164 | B1 | 2/2011 | Alben et al. | 713/300 |
| 8,250,133 | B2 | 8/2012 | Blumrich et al. | 709/201 |
| 8,601,287 | B1 | 12/2013 | Weber | |
| 8,972,702 | B2 | 3/2015 | Banerjee et al. | 712/220 |

(Continued)

FOREIGN PATENT DOCUMENTS

| WO | WO 2011/077103 A1 | 6/2011 | G06F 15/80 |
|---|---|---|---|
| WO | WO-2016182851 | 11/2016 | |

OTHER PUBLICATIONS

Fourestey et al., "First Experiences With Validating and Using the Cray Power Management Database Tool", Cornell University Library, paper was presented at the 2014 Cray User Group (CUG) user meeting in Lugano, Switzerland, , 7 pages, dated Aug. 12, 2014.

(Continued)

*Primary Examiner* — Aurel Prifti
(74) *Attorney, Agent, or Firm* — Sunstein Kann Murphy & Timbers LLP

(57) ABSTRACT

A method controls power consumption in a high performance computing system having a plurality of nodes by gathering information relating to the plurality of nodes in the high performance computing system, setting a power range to a given power range for the plurality of nodes as a function of the gathered information, and executing an application program on one or more of the nodes. The method also receives power commands from the application program relative to the one or more nodes, and responsively changes the power range to a new power range for the one or more nodes executing the application program. Thus, the one or more nodes execute the application program within the new power range.

20 Claims, 6 Drawing Sheets

(56) References Cited

U.S. PATENT DOCUMENTS

| | | | | |
|---|---|---|---|---|
| 2008/0256371 A1* | 10/2008 | Diab | ............. | H04L 12/10 713/300 |
| 2009/0077396 A1* | 3/2009 | Tsai, Jr. | ............. | G06F 1/3209 713/310 |
| 2010/0235003 A1 | 9/2010 | Maly | ............. | 700/276 |
| 2011/0131425 A1 | 6/2011 | Banerjee et al. | ............. | 713/300 |
| 2011/0289329 A1* | 11/2011 | Bose | ............. | G06F 1/329 713/320 |
| 2012/0110360 A1* | 5/2012 | Lin | ............. | G06F 1/3215 713/324 |
| 2012/0260118 A1* | 10/2012 | Jiang | ............. | G06F 9/4843 713/340 |
| 2013/0024708 A1* | 1/2013 | Goodrum | ............. | G06F 1/3206 713/323 |
| 2013/0103929 A1 | 4/2013 | Ballew et al. | ............. | 712/42 |
| 2013/0226362 A1* | 8/2013 | Jagadishprasad | ............. | G06F 9/5094 700/297 |
| 2013/0318371 A1* | 11/2013 | Hormuth | ............. | G06F 1/28 713/320 |
| 2014/0047342 A1* | 2/2014 | Breternitz | ............. | G06F 9/5061 715/735 |
| 2014/0143558 A1* | 5/2014 | Kuesel | ............. | G06F 1/26 713/300 |
| 2015/0019917 A1 | 1/2015 | Fahimi et al. | ............. | 714/42 |
| 2015/0146593 A1* | 5/2015 | Patil | ............. | H04W 52/0225 370/311 |

OTHER PUBLICATIONS

International Searching Authority, Invitation to Pay Additional Fees and, Where Applicable, Protest Fee—International Application No. PCT/US2016/031001, dated Aug. 23, 2016, 5 pages.

PCT/ISA, International Search Report, dated Nov. 6, 2016, PCT/US2016/031001, 12 pages.

* cited by examiner

METHOD AND APPARATUS FOR MANAGING NODAL POWER IN A HIGH PERFORMANCE COMPUTER SYSTEM

FIELD OF THE INVENTION

The invention generally relates to high performance computer systems and, more particularly, the invention relates to managing power in a high performance computer system.

BACKGROUND OF THE INVENTION

In distributed processing systems, multiple processors communicate with each other and with memory devices to perform a shared computation. Because the types of computations involved are generally very complex or require a great deal of processing power, this type of communication often must be very high speed.

High-performance computing ("HPC") systems further increase speed by using specialized hardware that is not generally available commercially off-the-shelf for use in, for example, desktop or server computers. This specialized hardware often includes a plurality of computing nodes having customized application-specific integrated circuits ("ASICs") with a number of communications channels for communicating with other ASICS on other nodes (and components on the same node). Such hardware also includes the processors, memory, and other specialized hardware unique to implement a tightly-coupled HPC system. HPC systems thus often divide execution of complex computations across multiple of these interconnected nodes.

In dividing a computational task, the nodes often are allocated a prescribed power range in which they can operate. This power range typically is set by some central controller that allocates a common power range for all relevant nodes. Such a system, however, does not account for differing power requirements of different nodes at different times. Accordingly, prior art HPC systems known to the inventors taking such an approach can suffer from inefficiencies, latencies, and jitter.

SUMMARY OF VARIOUS EMBODIMENTS

In accordance with one embodiment of the invention, a method controls power consumption in a high performance computing system having a plurality of nodes by gathering information relating to the plurality of nodes in the high performance computing system, setting a power range to a given power range for the plurality of nodes as a function of the gathered information, and executing an application program on one or more of the nodes. The method also receives power commands from the application program relative to the one or more nodes, and responsively changes the power range to a new power range for the one or more nodes executing the application program. Thus, the one or more nodes execute the application program within the new power range.

The application program may determine its own power requirements and generate the power commands as a function of those determined power requirements. Some embodiments form the power commands to include instructions that cause a power controller in the high performance computing system to dynamically change the power range. Moreover, when changing the power range, the method may maintain at least one of the plurality of nodes at the given power range. In some implementations, this at least one node does not execute the application program.

The new power range may increase a limit, decrease a limit, or simply remove any power limitations for the application program. The application program may receive second information relating to its power, and responsively forward a request to change the new power range to a second new power range after receiving the second information. In response, the method may change the power range to the second new power range after the application program forwards the request. The one or more nodes thus execute the application program within the second new power range.

Like other high performance computer systems, the method may operate on one or more nodes with at least one microprocessor having a clock speed. In this case, the application program may dynamically vary the power by modifying the clock speed of the at least one microprocessor.

In accordance with another embodiment, a high performance computing system has a plurality of nodes, and a power controller operatively coupled with the one or more nodes. One or more of the plurality of nodes is configured to run an application program. The power controller is configured to gather information relating to the plurality of nodes and set a given power range for the plurality of nodes as a function on the gathered information. In response to power commands received from the application program relative to the one or more nodes, the power controller is configured to change the power range to a new power range for the one or more nodes for executing the application program. In that case, the one or more nodes are configured to execute the application program within the new power range.

Illustrative embodiments of the invention are implemented as a computer program product having a computer usable medium with computer readable program code thereon. The computer readable code may be read and utilized by a computer system in accordance with conventional processes.

BRIEF DESCRIPTION OF THE DRAWINGS

Those skilled in the art should more fully appreciate advantages of various embodiments of the invention from the following "Description of Illustrative Embodiments," discussed with reference to the drawings summarized immediately below.

DESCRIPTION OF ILLUSTRATIVE EMBODIMENTS

In illustrative embodiments, an application program executing on a high performance computing system dynamically varies its permitted power range. To that end, using information related to a plurality of nodes in the system, a central controller sets an initial power range for the system. The application, which is configured to execute on a subset of the plurality of nodes (i.e., it executes on one or more nodes of the system), also initially is intended to follow this initial power range. In response to changing or unique requirements, however, the application program can request a new/different power range for its nodes. In fact, the application program can request this different power range even before receiving the initial power range.

The central controller thus may change the power range of the one or more nodes executing the application program. As such, the one or nodes subsequently uses that new power range to execute the processes required by the application program. Such dynamic power control can more efficiently coordinate power usage and processing among the plurality of nodes in the system, effectively improving overall system performance. Details of illustrative embodiments are discussed below.

System Architecture

Figure 1:
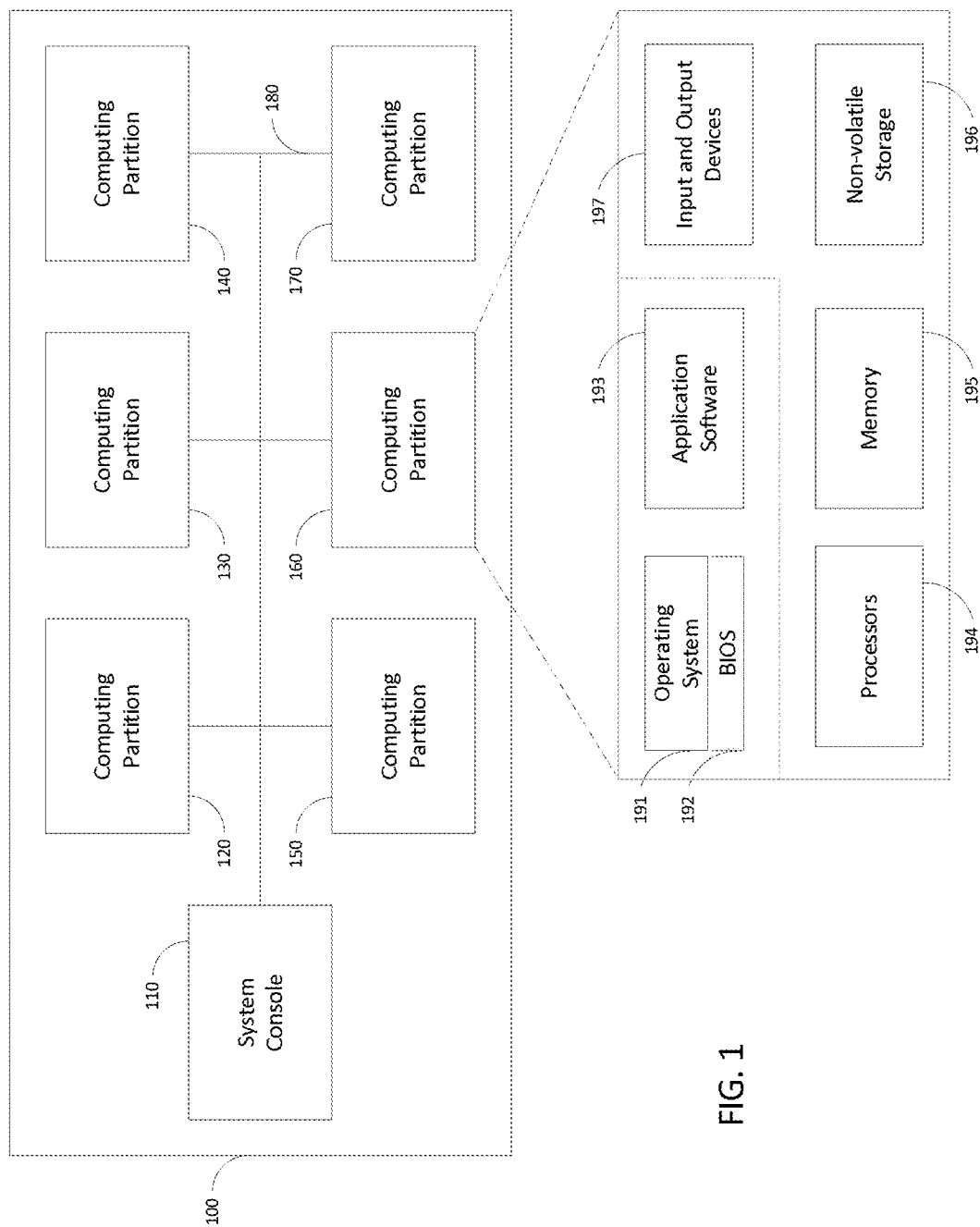
FIG. 1 schematically shows a logical view of an HPC system in accordance with one embodiment of the present invention.

FIG. 1 schematically shows a logical view of an exemplary high-performance computing system 100 that may be used with illustrative embodiments of the present invention. Specifically, as known by those in the art, a "high-performance computing system," or "HPC system," is a computing system having a plurality of modular computing resources that are tightly coupled using hardware interconnects, so that processors may access remote data directly using a common memory address space.

The HPC system 100 includes a number of logical computing partitions 120, 130, 140, 150, 160, 170 for providing computational resources, and a system console 110 for managing the plurality of partitions 120-170. A "computing partition" (or "partition") in an HPC system is an administrative allocation of computational resources that runs a single operating system instance and has a common memory address space. Partitions 120-170 may communicate with the system console 110 using a logical communication network 180. A system user, such as a scientist or engineer who desires to perform a calculation, may request computational resources from a system operator, who uses the system console 110 to allocate and manage those resources. Allocation of computational resources to partitions is described below. The HPC system 100 may have any number of computing partitions that are administratively assigned as described in more detail below, and often has only one partition that encompasses all of the available computing resources. Accordingly, this figure should not be seen as limiting the scope of the invention.

Each computing partition, such as partition 160, may be viewed logically as if it were a single computing device, akin to a desktop computer. Thus, the partition 160 may execute software, including a single operating system ("OS") instance 191 that uses a basic input/output system ("BIOS") 192 as these are used together in the art, and application software 193 for one or more system users.

Accordingly, as also shown in FIG. 1, a computing partition has various hardware allocated to it by a system operator, including one or more processors 194, volatile memory 195, non-volatile storage 196, and input and output ("I/O") devices 197 (e.g., network ports, video display devices, keyboards, and the like). However, in HPC systems like the embodiment in FIG. 1, each computing partition has a great deal more processing power and memory than a typical desktop computer. The OS software may include, for example, a Windows® operating system by Microsoft Corporation of Redmond, Wash., or a Linux operating system. Moreover, although the BIOS may be provided as firmware by a hardware manufacturer, such as Intel Corporation of Santa Clara, Calif., it is typically customized according to the needs of the HPC system designer to support high-performance computing, as described below in more detail.

As part of its system management role, the system console 110 acts as an interface between the computing capabilities of the computing partitions 120-170 and the system operator or other computing systems. To that end, the system console 110 issues commands to the HPC system hardware and software on behalf of the system operator that permit, among other things: 1) booting the hardware, 2) dividing the system computing resources into computing partitions, 3) initializing the partitions, 4) monitoring the health of each partition and any hardware or software errors generated therein, 5) distributing operating systems and application software to the various partitions, 6) causing the operating systems and software to execute, 7) backing up the state of the partition or software therein, 8) shutting down application software, and 9) shutting down a computing partition or the entire HPC system 100. These particular functions are described in more detail in the section below entitled "System Operation."

Figure 2:
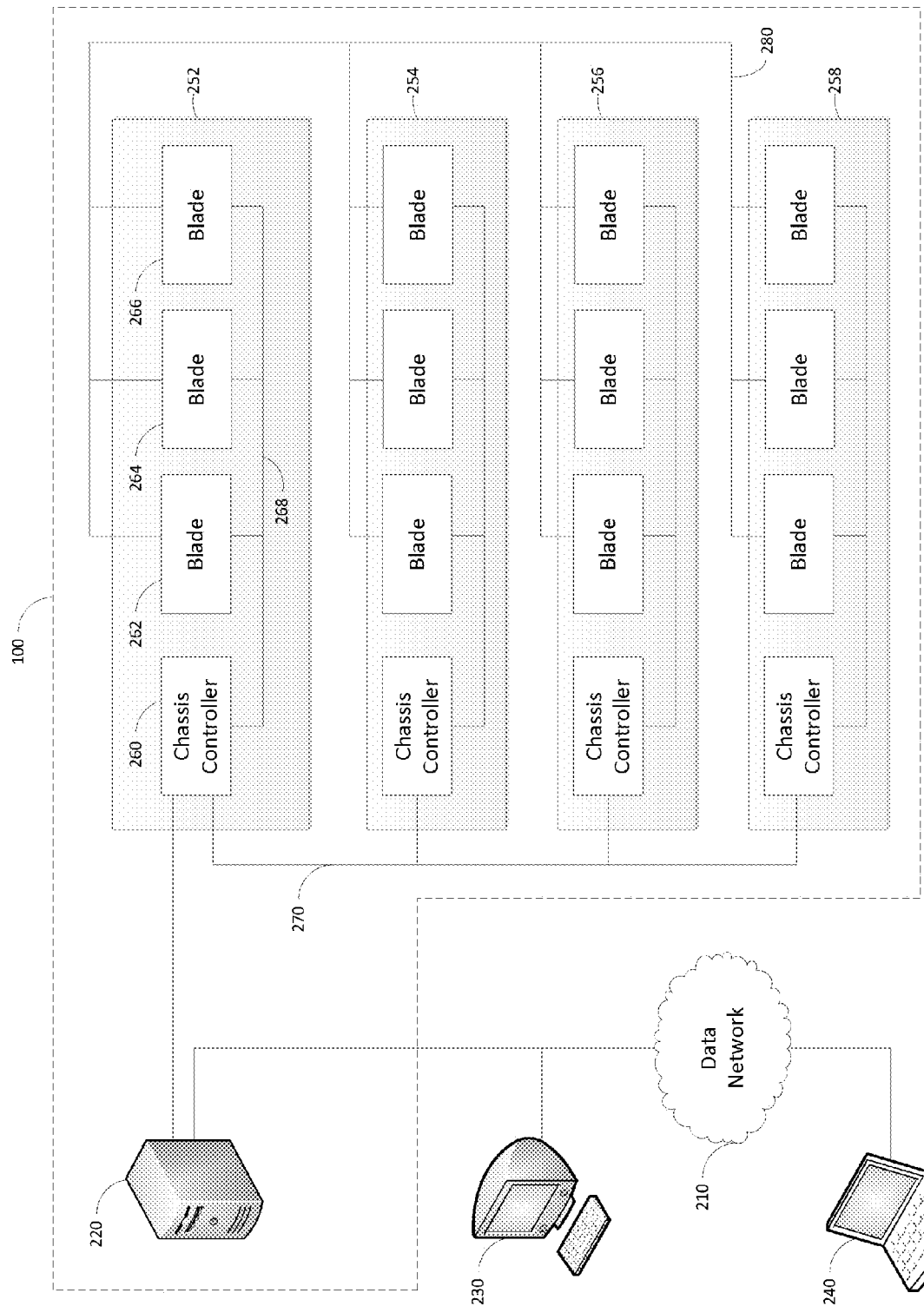
FIG. 2 schematically shows a physical view of the HPC system of FIG. 1.

FIG. 2 schematically shows a physical view of a high performance computing system 100 in accordance with the embodiment of FIG. 1. The hardware that comprises the HPC system 100 of FIG. 1 is surrounded by the dashed line. The HPC system 100 is connected to a customer data network 210 to facilitate customer access.

The HPC system 100 includes a system management node ("SMN") 220 that performs the functions of the system console 110. The management node 220 may be implemented as a desktop computer, a server computer, or other similar computing device, provided either by the customer or the HPC system designer, and includes software necessary to control the HPC system 100 (i.e., the system console software).

The HPC system 100 is accessible using the data network 210, which may include any data network known in the art, such as a customer local area network ("LAN"), a virtual private network ("VPN"), the Internet, or the like, or a combination of these networks. Any of these networks may permit a number of users to access the HPC system resources remotely and/or simultaneously. For example, the management node 220 may be accessed by a customer computer 230 by way of remote login using tools known in the art such as Windows® Remote Desktop Services or the UNIX secure shell. If the customer is so inclined, access to the HPC system 100 may be provided to a remote computer 240. The remote computer 240 may access the HPC system by way of a login to the management node 220 as just described, or using a gateway or proxy system as is known to persons in the art.

The hardware computing resources of the HPC system 100 (e.g., the processors, memory, non-volatile storage, and I/O devices shown in FIG. 1) are provided collectively by one or more "blade chassis," such as blade chassis 252, 254, 256, 258 shown in FIG. 2, that are managed and allocated into computing partitions. A blade chassis is an electronic chassis that is configured to house, power, and provide high-speed data communications between a plurality of stackable, modular electronic circuit boards called "blades." Each blade includes enough computing hardware to act as a standalone computing server. The modular design of a blade chassis permits the blades to be connected to power and data lines with a minimum of cabling and vertical space.

Accordingly, each blade chassis, for example blade chassis 252, has a chassis management controller 260 (also referred to as a "chassis controller" or "CMC") for managing system functions in the blade chassis 252, and a number of blades 262, 264, 266 for providing computing resources. Each blade, for example blade 262, contributes its hardware computing resources to the collective total resources of the HPC system 100. The system management node 220 manages the hardware computing resources of the entire HPC system 100 using the chassis controllers, such as chassis controller 260, while each chassis controller in turn manages the resources for just the blades in its blade chassis. The chassis controller 260 is physically and electrically coupled to the blades 262-266 inside the blade chassis 252 by means of a local management bus 268, described below in more detail. The hardware in the other blade chassis 254-258 is similarly configured.

The chassis controllers communicate with each other using a management connection 270. The management connection 270 may be a high-speed LAN, for example, running an Ethernet communication protocol, or other data bus. By contrast, the blades communicate with each other using a computing connection 280. To that end, the computing connection 280 illustratively has a high-bandwidth, low-latency system interconnect, such as NumaLink, developed by Silicon Graphics International Corp. of Fremont, Calif.

The chassis controller 260 provides system hardware management functions to the rest of the HPC system. For example, the chassis controller 260 may receive a system boot command from the SMN 220, and respond by issuing boot commands to each of the blades 262-266 using the local management bus 268. Similarly, the chassis controller 260 may receive hardware error data from one or more of the blades 262-266 and store this information for later analysis in combination with error data stored by the other chassis controllers. In some embodiments, such as that shown in FIG. 2, the SMN 220 or a customer computer 230 are provided access to a single, master chassis controller 260 that processes system management commands to control the HPC system 100 and forwards these commands to the other chassis controllers. In other embodiments, however, an SMN 220 is coupled directly to the management connection 270 and issues commands to each chassis controller individually. Persons having ordinary skill in the art may contemplate variations of these designs that permit the same type of functionality, but for clarity only these designs are presented.

The blade chassis 252, its blades 262-266, and the local management bus 268 may be provided as known in the art. However, the chassis controller 260 may be implemented using hardware, firmware, or software provided by the HPC system designer. Each blade provides the HPC system 100 with some quantity of processors, volatile memory, non-volatile storage, and I/O devices that are known in the art of standalone computer servers. However, each blade also has hardware, firmware, and/or software to allow these computing resources to be grouped together and treated collectively as computing partitions, as described below in more detail in the section entitled "System Operation."

While FIG. 2 shows an HPC system 100 having four chassis and three blades in each chassis, it should be appreciated that these figures do not limit the scope of the invention. An HPC system may have dozens of chassis and hundreds of blades; indeed, HPC systems often are desired because they provide very large quantities of tightly-coupled computing resources.

Figure 3:
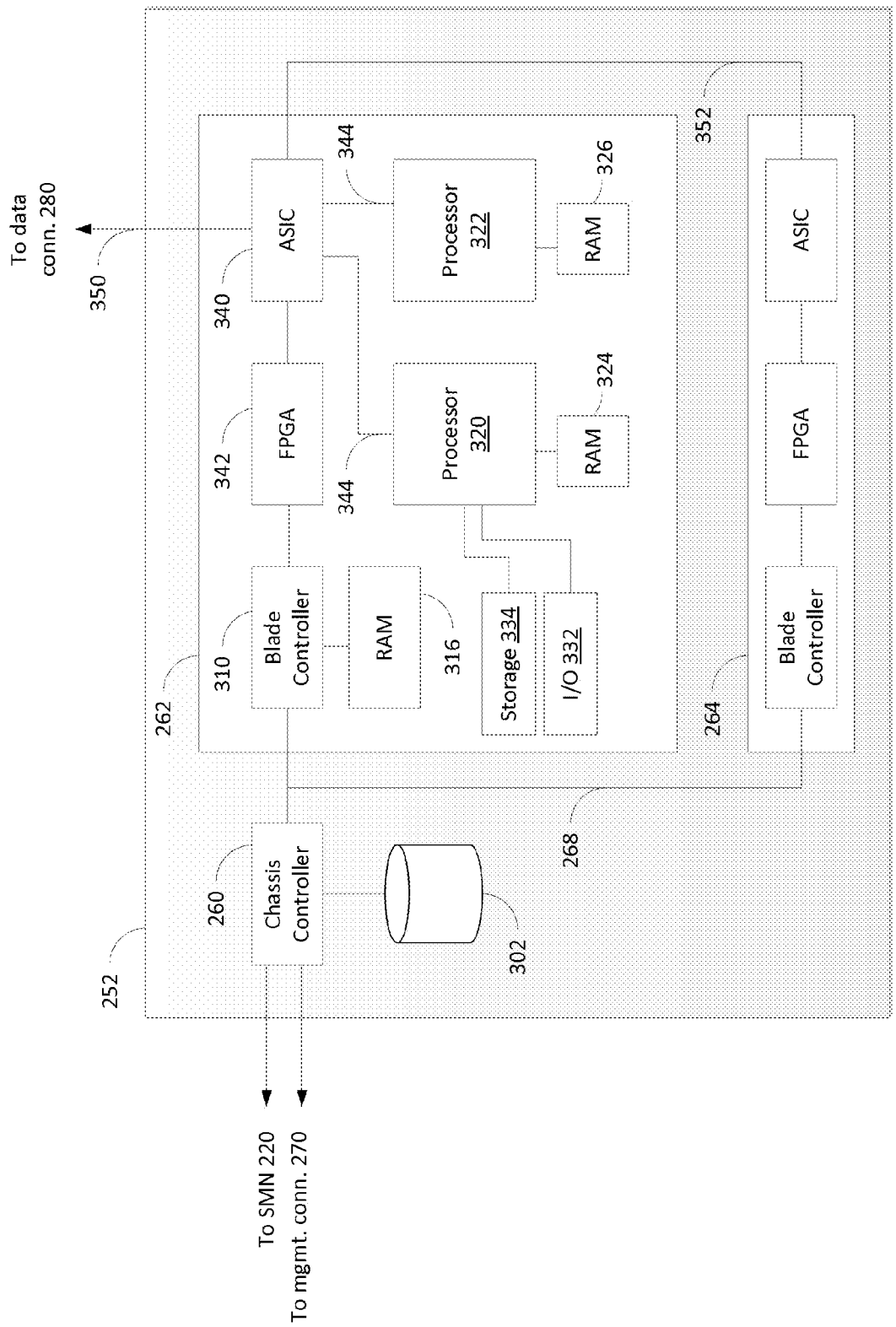
FIG. 3 schematically shows details of a blade chassis of the HPC system of FIG. 1.

FIG. 3 schematically shows a single blade chassis 252 in more detail. In this figure, parts not relevant to the immediate description have been omitted. The chassis controller 260 is shown with its connections to the system management node 220 and to the management connection 270. The chassis controller 260 may be provided with a chassis data store 302 for storing chassis management data. In some embodiments, the chassis data store 302 is volatile random access memory ("RAM"), in which case data in the chassis data store 302 are accessible by the SMN 220 so long as power is applied to the blade chassis 252, even if one or more of the computing partitions has failed (e.g., due to an OS crash) or a blade has malfunctioned. In other embodiments, the chassis data store 302 is non-volatile storage such as a hard disk drive ("HDD") or a solid state drive ("SSD"). In these embodiments, data in the chassis data store 302 are accessible after the HPC system has been powered down and rebooted.

FIG. 3 shows relevant portions of specific implementations of the blades 262 and 264 for discussion purposes. The blade 262 includes a blade management controller 310 (also called a "blade controller" or "BMC") that executes system management functions at a blade level, in a manner analogous to the functions performed by the chassis controller at the chassis level. For more detail on the operations of the chassis controller and blade controller, see the section entitled "System Operation" below. The blade controller 310 may be implemented as custom hardware, designed by the HPC system designer to permit communication with the chassis controller 260. In addition, the blade controller 310 may have its own RAM 316 to carry out its management functions. The chassis controller 260 communicates with the blade controller of each blade using the local management bus 268, as shown in FIG. 3 and the previous figures.

The blade 262 also includes one or more processors 320, 322 that are connected to RAM 324, 326. Blade 262 may be alternately configured so that multiple processors may access a common set of RAM on a single bus, as is known in the art. It should also be appreciated that processors 320, 322 may include any number of central processing units ("CPUs") or cores, as is known in the art. The processors 320, 322 in the blade 262 are connected to other items, such as a data bus that communicates with I/O devices 332, a data bus that communicates with non-volatile storage 334, and other buses commonly found in standalone computing systems. (For clarity, FIG. 3 shows only the connections from processor 320 to these other devices.) The processors 320, 322 may be, for example, Intel® Core™ processors manufactured by Intel Corporation. The I/O bus may be, for example, a PCI or PCI Express ("PCIe") bus. The storage bus may be, for example, a SATA, SCSI, or Fibre Channel bus. It will be appreciated that other bus standards, processor types, and processor manufacturers may be used in accordance with illustrative embodiments of the present invention.

Each blade (e.g., the blades 262 and 264) includes an application-specific integrated circuit 340 (also referred to as an "ASIC", "hub chip", or "hub ASIC") that controls much of its functionality. More specifically, to logically connect the processors 320, 322, RAM 324, 326, and other devices 332, 334 together to form a managed, multi-processor, (optionally) coherently-shared distributed-memory HPC system, the processors 320, 322 are electrically connected to the hub ASIC 340. The hub ASIC 340 thus provides an interface between the HPC system management functions generated by the SMN 220, chassis controller 260, and blade controller 310, and the computing resources of the blade 262.

In this connection, the hub ASIC 340 connects with the blade controller 310 either through a direct connection, or by way of a field-programmable gate array ("FPGA") 342 or similar programmable device for passing signals between integrated circuits. Those skilled in the art can select the appropriate connection between the hub ASIC 340 and the blade controller 310. Discussion of the direct connection or indirect connection should not limit various embodiments of the invention.

In particular, signals are generated on output pins of the blade controller 310, in response to commands issued by the chassis controller 260. In the indirect connection case, these signals are translated by the FPGA 342 into commands for certain input pins of the hub ASIC 340, and vice versa. For example, a "power on" signal received by the blade controller 310 from the chassis controller 260 requires, among other things, providing a "power on" voltage to a certain pin on the hub ASIC 340; the FPGA 342 facilitates this task.

The field-programmable nature of the FPGA 342 permits the interface between the blade controller 310 and ASIC 340 to be reprogrammable after manufacturing. Thus, for example, the blade controller 310 and ASIC 340 may be designed to have certain generic functions, and the FPGA 342 may be used advantageously to program the use of those functions in an application-specific way. The communications interface between the blade controller 310 and ASIC 340 also may be updated if a hardware design error is discovered in either module, permitting a quick system repair without requiring new hardware to be fabricated.

Also in connection with its role as the interface between computing resources and system management, the hub ASIC 340 is connected to the processors 320, 322 by way of a high-speed processor interconnect 344. In one embodiment, the processors 320, 322 are manufactured by Intel Corporation which provides the Intel® QuickPath Interconnect ("QPI") for this purpose, and the hub ASIC 340 includes a module for communicating with the processors 320, 322 using QPI. Other embodiments may use other processor interconnect configurations.

The hub chip 340 in each blade also provides connections to other blades for high-bandwidth, low-latency data communications. Thus, the hub chip 340 includes a link 350 to the computing connection 280 that connects different blade chassis. This link 350 may be implemented using networking cables, for example. The hub ASIC 340 also includes connections to other blades in the same blade chassis 252. The hub ASIC 340 of blade 262 connects to the hub ASIC 340 of blade 264 by way of a chassis computing connection 352. The chassis computing connection 352 may be implemented as a data bus on a backplane of the blade chassis 252 rather than using networking cables, advantageously allowing the very high speed data communication between blades that is required for high-performance computing tasks. Data communication on both the inter-chassis computing connection 280 and the intra-chassis computing connection 352 may be implemented using the NumaLink protocol or a similar protocol.

HPC System Operation

System management commands generally propagate from the SMN 220, through the management connection 270 to the blade chassis (and their chassis controllers), then to the blades (and their blade controllers), and finally to the hub ASICS that implement the commands using the system computing hardware.

As a concrete example, consider the process of powering on an HPC system. In accordance with exemplary embodiments, the HPC system 100 is powered when a system operator issues a "power on" command from the SMN 220. The SMN 220 propagates this command to each of the blade chassis 252-258 by way of their respective chassis controllers, such as chassis controller 260 in blade chassis 252. Each chassis controller, in turn, issues a "power on" command to each of the respective blades in its blade chassis by way of their respective blade controllers, such as blade controller 310 of blade 262. Blade controller 310 issues a "power on" command to its corresponding hub chip 340 using the FPGA 342, which provides a signal on one of the pins of the hub chip 340 that allows it to initialize. Other commands propagate similarly.

Once the HPC system is powered on, its computing resources may be divided into computing partitions. The quantity of computing resources that are allocated to each computing partition is an administrative decision. For example, a customer may have a number of projects to complete, and each project is projected to require a certain amount of computing resources. Different projects may require different proportions of processing power, memory, and I/O device usage, and different blades may have different quantities of the resources installed. The HPC system administrator takes these considerations into account when partitioning the computing resources of the HPC system 100. Partitioning the computing resources may be accomplished by programming each blade's RAM 316. For example, the SMN 220 may issue appropriate blade programming commands after reading a system configuration file.

The collective hardware computing resources of the HPC system 100 may be divided into computing partitions according to any administrative need. Thus, for example, a single computing partition may include the computing resources of some or all of the blades of one blade chassis 252, all of the blades of multiple blade chassis 252 and 254, some of the blades of one blade chassis 252 and all of the blades of blade chassis 254, all of the computing resources of the entire HPC system 100, and other similar combinations. Hardware computing resources may be partitioned statically, in which case a reboot of the entire HPC system 100 is required to reallocate hardware. Alternatively and preferentially, hardware computing resources are partitioned dynamically while the HPC system 100 is powered on. In this way, unallocated resources may be assigned to a partition without interrupting the operation of other partitions.

It should be noted that once the HPC system 100 has been appropriately partitioned, each partition may be considered to act as a standalone computing system. Thus, two or more partitions may be combined to form a logical computing group inside the HPC system 100. Such grouping may be necessary if, for example, a particular computational task is allocated more processors or memory than a single operating system can control. For example, if a single operating system can control only 64 processors, but a particular computational task requires the combined power of 256 processors, then four partitions may be allocated to the task in such a group. This grouping may be accomplished using techniques known in the art, such as installing the same software on each computing partition and providing the partitions with a VPN.

Once at least one partition has been created, the partition may be booted and its computing resources initialized. Each computing partition, such as partition 160, may be viewed logically as having a single OS 191 and a single BIOS 192.

As is known in the art, BIOS is a collection of instructions that electrically probes and initializes the available hardware to a known state so that the OS can boot, and is typically provided in a firmware chip on each physical server. However, a single logical computing partition 160 may span several blades, or even several blade chassis. A blade may be referred to as a "computing node" or simply a "node" to emphasize its allocation to a particular partition.

Booting a partition in accordance with an embodiment of the invention requires a number of modifications to be made to a blade chassis that is purchased from stock. In particular, the BIOS in each blade are modified to determine other hardware resources in the same computing partition, not just those in the same blade or blade chassis. After a boot command has been issued by the SMN 220, the hub ASIC 340 eventually provides an appropriate signal to the processor 320 to begin the boot process using BIOS instructions. The BIOS instructions, in turn, obtain partition information from the hub ASIC 340 such as: an identification (node) number in the partition, a node interconnection topology, a list of devices that are present in other nodes in the partition, a master clock signal used by all nodes in the partition, and so on. Armed with this information, the processor 320 may take whatever steps are required to initialize the blade 262, including 1) non-HPC-specific steps such as initializing I/O devices 332 and non-volatile storage 334, and 2) also HPC-specific steps such as synchronizing a local hardware clock to a master clock signal, initializing HPC-specialized hardware in a given node, managing a memory directory that includes information about which other nodes in the partition have accessed its RAM, and preparing a partition-wide physical memory map.

At this point, each physical BIOS has its own view of the partition, and all of the computing resources in each node are prepared for the OS to load. The BIOS then reads the OS image and executes it, in accordance with techniques known in the art of multiprocessor systems. The BIOS presents to the OS a view of the partition hardware as if it were all present in a single, very large computing device, even if the hardware itself is scattered among multiple blade chassis and blades. In this way, a single OS instance spreads itself across some, or preferably all, of the blade chassis and blades that are assigned to its partition. Different operating systems may be installed on the various partitions. If an OS image is not present, for example immediately after a partition is created, the OS image may be installed using processes known in the art before the partition boots.

Once the OS is safely executing, its partition may be operated as a single logical computing device. Software for carrying out desired computations may be installed to the various partitions by the HPC system operator. Users may then log into the SMN 220. Access to their respective partitions from the SMN 220 may be controlled using volume mounting and directory permissions based on login credentials, for example. The system operator may monitor the health of each partition, and take remedial steps when a hardware or software error is detected. The current state of long-running application programs may be saved to non-volatile storage, either periodically or on the command of the system operator or application user, to guard against losing work in the event of a system or application crash. The system operator or a system user may issue a command to shut down application software. Other operations of an HPC partition may be known to a person having ordinary skill in the art. When administratively required, the system operator may shut down a computing partition entirely, reallocate or deallocate computing resources in a partition, or power down the entire HPC system 100.

Power Management

Figure 4:
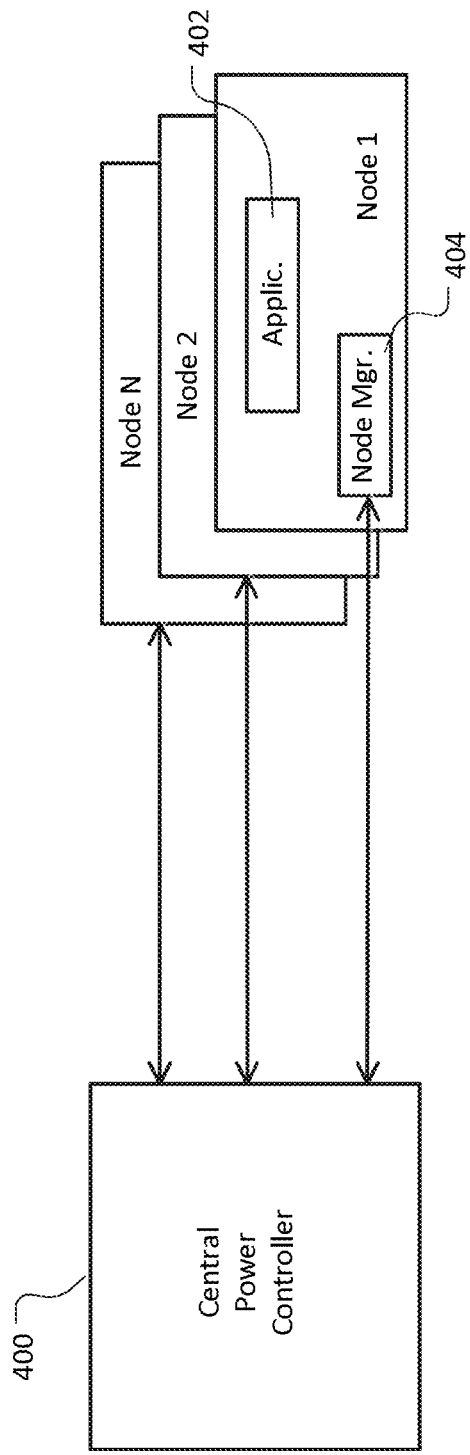
FIG. 4 schematically shows another representation of a plurality of nodes in the high-performance computing system of FIG. 1

As noted above, illustrative embodiments manage node power to ensure a more efficient and effective operation. To that end, FIG. 4 schematically shows another representation of a plurality of nodes (identified below as "nodes 400") in the high-performance computing system 100 of FIG. 1. Specifically, this figure shows a plurality of nodes 400, labeled as Node 1, Node 2 . . . Node N, that communicate with a central power controller 401 to coordinate their power needs. In other words, as discussed in greater detail below, after collecting the relevant system information, the central power controller 401 sets a power range in which the nodes 400 are required to operate.

In illustrative embodiments, the central power controller 401 is implemented separately from the nodes 400 and thus, has independent components, such as independent boards (e.g., motherboards, daughterboards, etc.), microprocessors, memory, etc. For example, the central power controller 401 may be implemented at least in part as a system management controller ("SMC," distributed by Intel Corporation of Santa Clara, Calif.), which controls power use in computer systems. The nodes 400 communicate with the central power controller 401 using any of the above noted interconnection mechanisms.

In addition to the components described in prior sections of this description for each node 400, this representation simply shows each node 400 executing an application program (referred to below as "application program 402"), and having a node manager 404 for managing its power functionality. Although showing only one application program 402, this figure should be considered to represent pluralities of application programs 402 that each execute across one or more of any of the nodes 400. For example, the first application program 402 may execute across Nodes 1, 3, and 44, while a second application may execute on Node 1 only, and a third application program 402 may execute across Nodes 3, 5, and 10-60. Accordingly, discussion of a single application executing on one or a few nodes is for simplicity purposes only.

Each node manager 404, which may be implemented as part of the hub ASIC 340 or as another component, preferably has a prescribed set of power management functions. To that end, each node manager 404 may be considered to be a dedicated management device on each node 400. As a functional module that communicates via the management network of the HPC 100, each node manager 404 measures and controls node power, provides power and usage statistics, and manages and enforces power policies. The node manager 404 thus can read an average power from power supplies, reduce power draw to the processors by reducing processor frequencies, and regulate power and frequency to a target limit. For example, the node manager 404 can manage and enforce power policies set by the central power controller 401.

Indeed, it should be noted that, like FIGS. 1-3 and 5 (discussed below) FIG. 4 only schematically generically shows certain components. Those skilled in the art should understand that each of these components can be implemented in a variety of conventional manners, such as by using hardware, software, or a combination of hardware and software, across one or more other functional components. For example, the central power controller 401 may be implemented using a plurality of microprocessors executing firmware. As another example, the central power controller 401 may be implemented using one or more application specific integrated circuits (i.e., "ASICs") and related software, or a combination of ASICs, discrete electronic components (e.g., transistors), and microprocessors. Accordingly, the representation of the central power controller 401 and other components in a single box of FIG. 4 is for simplicity purposes only. In fact, in some embodiments, the central power controller 401 of FIG. 4 is distributed across a plurality of different machines—not necessarily within the same housing or chassis.

It should be reiterated that the schematic representation of components in these figures is a significantly simplified representation of an actual devices they represent. Those skilled in the art should understand that such devices may have many other physical and functional components. Accordingly, this discussion is in no way intended to suggest that these figures represents all of the elements of a component shown in the figures.

Figure 5:
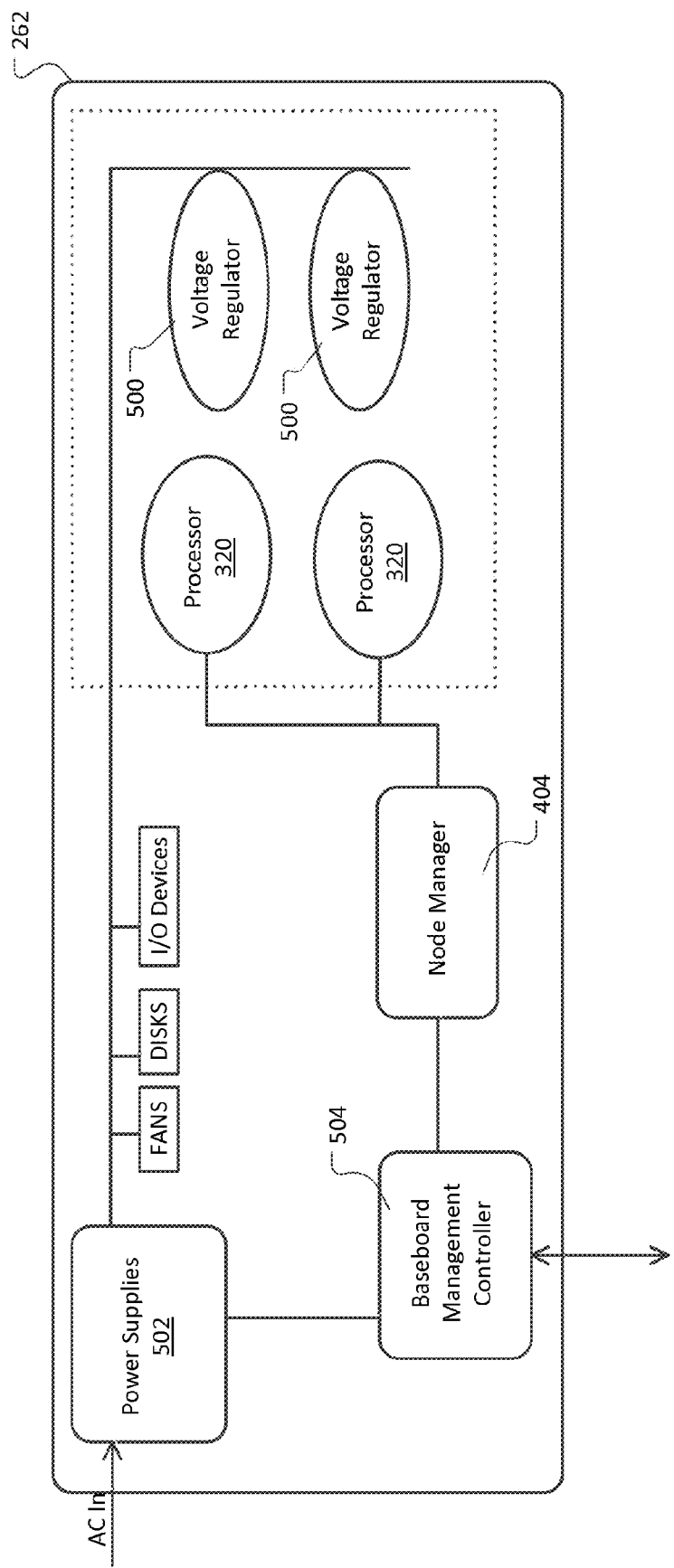
FIG. 5 schematically shows another view of one of the nodes of FIG. 4.

FIG. 5 schematically shows another view showing specific details of one of the nodes 400 of FIG. 4. In addition to showing the node manager 404, this figure also shows the processors 320 and voltage regulators 500 that control the power used by each of the processors 320. In addition, this figure also shows the power supply 502, which measures the power and converts input AC power to DC output power for use by the voltage regulators 500. The node 400 also has a baseboard management controller 504, which connects to system management to facilitate reading, obtaining, and setting power limits/ranges.

Figure 6:
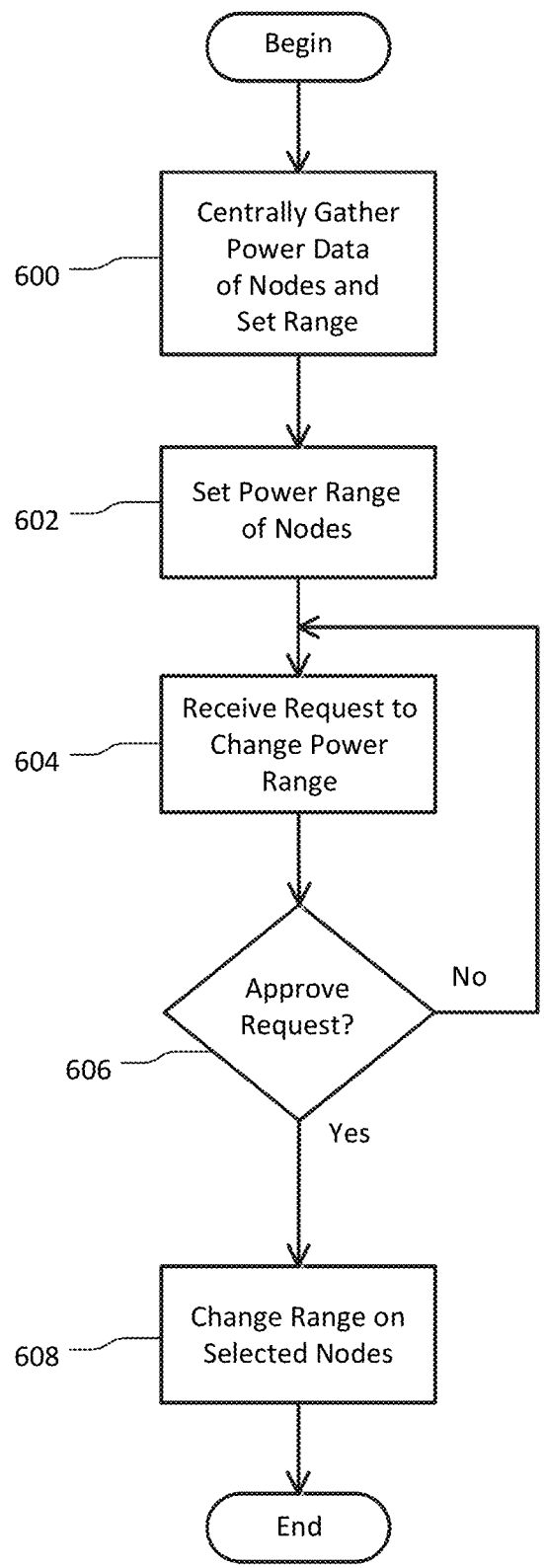
FIG. 6 shows a process of managing power consumption in a high-performance computing system in accordance with illustrative embodiments of the invention.

FIG. 6 shows a process of managing node power in the high-performance computing system 100 of FIG. 1. It should be noted that this process is substantially simplified from a longer process that normally would be used to manage power use by the nodes 400. Accordingly, the process can have many steps, such as specific techniques for formulate appropriate power levels, which those skilled in the art likely would use. In addition, some of the steps may be performed in a different order than that shown, or at the same time. Those skilled in the art therefore can modify the process as appropriate.

The process of FIG. 6 begins at step 600, in which the central power controller 401 gathers application information relating to the nodes 400 of the network that it manages. Among other things, the central power controller 401 may retrieve statistics, policies, and other relevant information from the node managers 404 on the plurality of nodes 400.

Some embodiments may have a plurality of different central power controllers 400 that are each assigned to specific pluralities of nodes 400 within the HPC system 100 (e.g., nodes within the same blade). Other embodiments, however, may have a single central power controller 401 that manages all of the nodes 400 within the HPC system 100. For simplicity purposes, this discussion only addresses a single central power controller 401 managing a plurality of nodes 400 of the HPC system 100. This plurality of nodes 400 also includes a set of nodes 400 executing an application program 402. This set of nodes 400 may include all of the plurality of nodes 400, or some smaller number of nodes 400. In fact, this set of nodes 400 can include a single mode executing a single application program 402.

After gathering the relevant information from the nodes, the central power controller 401 uses internal processes to set a prescribed power range for all of the nodes 400 it manages. In other words, using the gathered information, the central power controller 401 sets a centralized power range for the plurality of nodes 400. In illustrative embodiments, the power range has only a maximum power value. Accordingly, the nodes 400 managed by the central power controller 401 can run at powers up to the maximum power value. Other embodiments, however, may have ranges with both minimum and maximum power values.

Next, at 602, the central power controller 401 centrally sets/mandates the power range of the nodes 400 to the specified range determined at step 600. Illustrative embodiments may control power the number of ways, such as by limiting the clock speeds of the processors 322 resident in the nodes 400. Among other ways, this new power range may be set for an indefinite time period, or set to last for a prescribed time, such as until receipt of another mandated power range or until some event occurs.

To that end, the central power controller 401 forwards a power setting message to the node managers 404 the plurality of nodes 400 it manages; in this way, the central power controller 401 requires each of those nodes 400 to operate within the centrally mandated prescribed range. The node managers 404 responsively store this information in memory and limit power to this range as specified in the message.

Accordingly, this step sets the power limits of the plurality of nodes 400 to the specified range. Such a power range, however, may not be optimal for some set of the nodes 400, or all of the nodes 400. Specifically, several of the nodes 400 running a given application program 402 may require more power at certain times to efficiently and effectively execute. In that case, the centrally mandated power may be too low, slowing the processors 322 for those several nodes 400 to a reduced clock speed that is insufficient for the task the application program 402 must complete. If the given application program 402 cannot use the extra power (e.g., speeding up its processors 322), then it may lag other threads/application programs 402 executing on the system, causing a number of local and systemic problems. For example, this delay can cause jitter the system, local and system errors, and generally slow processing.

To minimize the likelihood of those problems from occurring, illustrative embodiments permit a given application to operate at a power level that is different than that centrally mandated for the entire system. For example, the given application may operate in a power level for a prescribed time that is higher than that mandated for the nodes 400.

More specifically, the given application typically is the best source of information about its power needs and can determine its power requirements. It thus can best make the determination about the optimal power required to efficiently and effectively complete processing. Accordingly, before, during, or after receipt of the centrally mandated power range from the central power controller 401, the given application program 402 can request and receive approval for a different power range.

To that end, at step 604, after determining its power needs, the given application program 402 generates a power command or request, which it forwards to the central power controller 401 for approval. Indeed, those in the art understand that this command may be forwarded between the application program 402 and central power controller 401 via a number of intervening functional modules. As such, there is no requirement that the application program 402 directly forward the power command to the central power controller 401.

This power command has instructions specifically requesting that the central power controller 401 change the power range for the set of nodes 400 upon which it is executing. The central power controller 401 responsively determines at step 606 if it can in fact approve/grant the request. For example, while increased power may be beneficial for the set of nodes 400 running the given application program 402, it may have an intolerably adverse impact on those or other nodes 400/application programs 402 if granted. If that is the case, or there are other reasons for denying the request, then the process simply loops back to step 604 and does not approve the request. This denial may iterate indefinitely, or for a prescribed number of requests. The system administrator or other entity may set policies for approving requests and the number of requests it may receive.

Conversely, the central power controller 401 may approve the request and set an appropriate power under prescribed parameters. For example, the central power controller 401 may simply change the power range without any other changes to other requirements of the nodes 400. Other embodiments may simply remove power limitations or restrictions, permitting the at least one node 400 to use whatever power it requires.

In some embodiments, however, to compensate for the increased power demands, the central power controller 401 may grant the request, but require that the application run at a lower power at certain times. For example, the central power controller 401 may grant increased power for prescribed times, but require that the total power used by the set of nodes 400 not exceed a prescribed total value. In this case, the application program 402 may have certain execution paths that require a minimal amount of power. When executing those paths, the application program 402 may be configured to use a lower amount of power than it originally intended to use. In this manner, the system can maintain consistent overall power demands while meeting periodic power spikes.

Accordingly, if the central power controller 401 approves the request at step 606, then the process will change the power range on the set of nodes 400 running the application requesting the new power range. To that end, illustrative embodiments of the central power controller 401 forward a power change message to the node managers 404 of the affected set of nodes 400. After receipt of the message, each node manager 404 adjusts its internal settings to operate within the parameters set by the central power controller 401. As noted above, these parameters may include power values, times, and amounts of time to use the range. In fact, these parameters may include a plurality of different power ranges for different times. As noted above, these different times can be set based upon events, specific times, or other bases as prescribed by those skilled in the art.

In some embodiments, if the application program 402 spans a plurality of nodes 400, then it may make only one request to the central power controller 401 for a power change in one, some, or all of the nodes 400 in which it is executing. Other embodiments, however, may make multiple such requests.

This process of FIG. 6 can repeat to dynamically change the power range even after the application program 402 has initially changed the power ranges of its set of nodes 400. Moreover, rather than having the application programs 402 determine and request power requirements, some embodiments may use other logic for controlling the power needs in the described manner. Such embodiments may be considered to cooperate with the application program 402 and effectively act as the application program 402.

Illustrative embodiments therefore enable a given application program 402 to dynamically change its power requirements to optimize system performance. Accordingly, the given application may have the capability to operate at speeds that ensure coherency, efficiency, and overall effectiveness.

Various embodiments of the invention may be implemented at least in part in any conventional computer programming language. For example, some embodiments may be implemented in a procedural programming language (e.g., "C"), or in an object oriented programming language (e.g., "C++"). Other embodiments of the invention may be implemented as a pre-configured, stand-along hardware element and/or as preprogrammed hardware elements (e.g., application specific integrated circuits, FPGAs, and digital signal processors), or other related components.

In an alternative embodiment, the disclosed apparatus and methods (e.g., see the various flow charts described above) may be implemented as a computer program product for use with a computer system. Such implementation may include a series of computer instructions fixed either on a tangible, non-transitory medium, such as a computer readable medium (e.g., a diskette, CD-ROM, ROM, or fixed disk). The series of computer instructions can embody all or part of the functionality previously described herein with respect to the system.

Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies.

Among other ways, such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). In fact, some embodiments may be implemented in a software-as-a-service model ("SAAS") or cloud computing model. Of course, some embodiments of the invention may be implemented as a combination of both software (e.g., a computer program product) and hardware. Still other embodiments of the invention are implemented as entirely hardware, or entirely software.

Although the above discussion discloses various exemplary embodiments of the invention, it should be apparent that those skilled in the art can make various modifications that will achieve some of the advantages of the invention without departing from the true scope of the invention.

What is claimed is:

1. A high performance computing system comprising:
   a plurality of nodes, each such node configurable to operate within a given power range, two or more of the plurality of nodes configurable to execute an application program; and
   a power controller operatively coupled with the two or more nodes to dynamically control power consumption of the two or more nodes by:
      receiving, from the application program, first power commands relative to the two or more nodes executing the application program;
      in response to receiving the first power commands, changing the power range for the two or more nodes executing the application program from the given power range to a first new power range, each of the two or more nodes thereafter executing the application program while operating within the first new power range;

receiving, from the application program, second power commands relative to the two or more nodes executing the application program; and in response to receiving the second power commands, changing the power range for the two or more nodes executing the application program from the first new power range to a second new power range, each of the two or more nodes thereafter executing the application program while operating within the second new power range.

2. The high performance computing system as defined by claim 1 wherein the power controller comprises a central power controller separate from the two or more nodes and at least one local power controller on the two or more nodes.

3. The high performance computing system as defined by claim 1 wherein each of the two or more nodes comprises a central hub unit and a plurality of microprocessors.

4. The high performance computing system as defined by claim 3 wherein the power controller is configured to change the power range for the two or more nodes by modifying a clock speed of at least one such microprocessor.

5. A method of dynamically controlling power consumption in a high performance computing system having a plurality of nodes, each node in the plurality of nodes initially operating within a given power range, two or more of the plurality of nodes executing an application program, the method comprising:

receiving, from the application program, first power commands relative to the two or more nodes executing the application program;

in response to receiving the first power commands, changing the power range for the two or more nodes executing the application program from the given power range to a first new power range, each of the two or more nodes thereafter executing the application program while operating within the first new power range;

receiving, from the application program, second power commands relative to the two or more nodes executing the application program; and in response to receiving the second power commands, changing the power range for the two or more nodes executing the application program from the first new power range to a second new power range, each of the two or more nodes thereafter executing the application program while operating within the second new power range.

6. The method as defined by claim 5 further comprising:
gathering information relating to the plurality of nodes in the high performance computing system; and
setting the given power range for the plurality of nodes as a function of the gathered information.

7. The method as defined by claim 5 wherein either or both of the first and second power commands was generated, by the application program, as a function of a power requirement, of the application program, that was determined by the application program.

8. The method as defined by claim 5 wherein either or both of the first and second new power ranges does not include any power limitations for the application program.

9. The method as defined by claim 5 wherein either or both of the first and second new power ranges comprises a plurality of power ranges within which to operate during a respective plurality of times.

10. The method as defined by claim 5 wherein changing the power range for the two or more nodes executing the application program is performed only after determining, in response to receiving either or both of the first and second power commands, that the high performance computing system supports changing the power range in accordance with the received power commands.

11. The method as defined by claim 5 wherein each of the two or more nodes includes at least one microprocessor, and wherein changing the power range for the two or more nodes comprises modifying a clock speed of at least one such microprocessor.

12. The method as defined by claim 5 wherein changing the power range comprises operating, within the given power range, at least one of the plurality of nodes in the high performance computing system that is not executing the application program.

13. A computer program product comprising a tangible, non-transitory computer usable medium having thereon computer readable program code that, when executed, causes performance of a method of dynamically controlling power consumption in a high performance computing system having a plurality of nodes, each of the plurality of nodes initially operating within a given power range, two or more of the plurality of nodes executing an application program, the method comprising:

receiving, from the application program, first power commands relative to the two or more nodes executing the application program;

in response to receiving the first power commands, changing the power range for the two or more nodes executing the application program from the given power range to a first new power range, each of the two or more nodes thereafter executing the application program while operating within the first new power range;

receiving, from the application program, second power commands relative to the two or more nodes executing the application program; and in response to receiving the second power commands, changing the power range for the two or more nodes executing the application program from the first new power range to a second new power range, each of the two or more nodes thereafter executing the application program while operating within the second new power range.

14. The computer program product as defined by claim 13 further comprising program code for:
gathering information relating to the plurality of nodes in the high performance computing system; and
setting the given power range for the plurality of nodes as a function of the gathered information.

15. The computer program product as defined by claim 13 further comprising program code for enabling the application program to generate either or both of the first and second power commands as a function of a power requirement, of the application program, that was determined by the application program.

16. The computer program product as defined by claim 13 wherein either or both of the first and second new power ranges does not include any power limitations for the application program.

17. The computer program product as defined by claim 13 wherein either or both of the first and second new power range comprises a plurality of power ranges within which to operate during a respective plurality of times.

18. The computer program product as defined by claim 13 wherein changing the power range for the two or more nodes executing the application program is performed only after determining, in response to receiving either or both of the first and second power commands, that the high performance computing system supports changing the power range in accordance with the received power commands.

19. The computer program product as defined by claim 13 wherein each of the two or more nodes includes at least one microprocessor, and wherein changing the power range for the two or more nodes comprises modifying a clock speed of at least one such microprocessor.

20. The computer program product as defined by claim 13 wherein changing the power range comprises operating, within the given power range, at least one of the plurality of nodes in the high performance computing system that is not executing the application program.

\* \* \* \* \*